US006560027B2

(12) United States Patent  
Meine

(10) Patent No.: US 6,560,027 B2
(45) Date of Patent: May 6, 2003

(54) SYSTEM AND METHOD FOR DISPLAYING INFORMATION ON A MIRROR

(75) Inventor: Robert K. Meine, Nampa, ID (US)

(73) Assignee: Hewlett-Packard Development Company, Palo Alto, CA (US)

( * ) Notice: Subject to any disclaimer, the term of this patent is extended or adjusted under 35 U.S.C. 154(b) by 5 days.

(21) Appl. No.: 09/746,366

(22) Filed: Dec. 21, 2000

(65) Prior Publication Data

US 2002/0080494 A1 Jun. 27, 2002

(51) Int. Cl.[7] ............................................. G02B 27/14
(52) U.S. Cl. ....................................... 359/630; 359/633
(58) Field of Search ................................. 359/630, 633

(56) References Cited

U.S. PATENT DOCUMENTS

| | | | | |
|---|---|---|---|---|
| 5,200,859 A | * | 4/1993 | Payner et al. ............... 359/857 |
| 5,808,819 A | * | 9/1998 | Deitz-Bertke et al. ...... 359/857 |
| 6,106,121 A | * | 8/2000 | Buckley et al. ............. 359/630 |
| 6,124,886 A | * | 9/2000 | DeLine et al. .............. 359/630 |
| 6,243,660 B1 | * | 6/2001 | Hsu et al. ................... 702/160 |

FOREIGN PATENT DOCUMENTS

| | | | | |
|---|---|---|---|---|
| FR | Wo 98/57215 | * | 12/1998 | ........... G02B/27/24 |
| JP | 402285172 A | * | 11/1990 | ......... E04H/001/12 |

* cited by examiner

*Primary Examiner*—Georgia Epps
*Assistant Examiner*—Alicia M. Harrington

(57) ABSTRACT

The inventive mirror provides both an image and information to a user. The inventive mirror allows a user to review electronic information, while performing personal hygiene procedures. For example, the user could look at the inventive mirror and review news headlines and/or stories, read and respond to e-mails, and/or review and edit their schedule of appointments, while grooming. The smart mirror has two modes. In a power off mode, the smart mirror acts as a standard reflective mirror. In a power on mode, then the smart mirror becomes a display device. The display device may comprise a touch screen, which would allow direct user interaction.

19 Claims, 2 Drawing Sheets

SYSTEM AND METHOD FOR DISPLAYING INFORMATION ON A MIRROR

BACKGROUND

People are often in a hurry. They rush to get ready in the morning; they rush through breakfast; they rush to get to work. People often overlap their various tasks to improve efficiency, for example some people will eat and work at the same time or they will eat and drive at the same time. Some people will even work and drive at the same time.

These people often do not have adequate time to plan their day. They frequently try to mentally plan their day while getting ready or driving, and then later put their schedule to writing in a daytimer or input it into a palm pilot. However, this type of planning is ineffective as task items are forgotten or miss entered. Moreover, the daytime or palm pilot may not be in accessible location, e.g. it may be left at home or work.

These people also do not have time to log on to news, stocks and electronic information service that have become a part of their lives before going to work. They have to get their desired news and information at a later time, e.g. after logging in at work or in the evening.

Therefore, there is a need for people to be able to plan their day and receive news and information before they leave their homes.

SUMMARY OF THE INVENTION

The present invention is directed to a system and method which comprises an information display panel and a mirror to form a smart mirror.

Such a smart mirror would preferably be placed in the bathroom, since a person spends a certain amount of time in the bathroom preparing for the day. The mirror would allow a person to review electronic news and information, as well as their schedule, while preparing for the day, e.g. brushing teeth, shaving, styling hair, washing up, applying makeup, drying off, etc. By allowing interaction with the smart mirror, a person could revise their schedule, and select the news and information that they would like to receive. The invention provides all of this information in one place, thus the user does not have to look to multiple sources which may be in multiple locations. The user could review the news, information, and schedule as part of their morning preparations.

The user could look at the smart mirror and review news headlines and/or stories, read and respond to e-mails, and/or review and edit their schedule of appointments. Thus, the user can receive news information in the morning, instead of in the evening, for example sports news, weather reports, business or stock market information, and/or local or national news. Also the user can review e-mails that have been delivered from the evening before and overnight, e.g. e-mails from information gatherers or list services that the user has enrolled with.

The smart mirror has two modes. In a power off mode, the smart mirror acts as a standard reflective mirror. In a power on mode, then the smart mirror becomes a display device. The display device may comprise a touch screen, which would allow direct user interaction.

The smart mirror could be connected to a computer system that is located elsewhere in the dwelling, e.g. an office, or adjacent to the smart mirror, e.g. behind the smart mirror. Preferably, the smart mirror is connected to the Internet to be able to send/receive e-mails, as wells as display web information. This would allow a user to configure the smart mirror to display desired information, e.g. news, stocks, etc, from selected sources, e.g. CNN, UPI, stock companies, etc. The connection to the computer system would allow access to the user's appointment schedule. The user could then review and/or change the appointments, tasks, and/or notes in the schedule or calendar. The user could then have the schedule downloaded to a personal data assistant, e.g. palm pilot, or printed out for inclusion with an appointment book, e.g. dayrunner. The user could also e-mail the schedule to a work location or to another person, e.g. administrative assistant.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION

Figure 1:
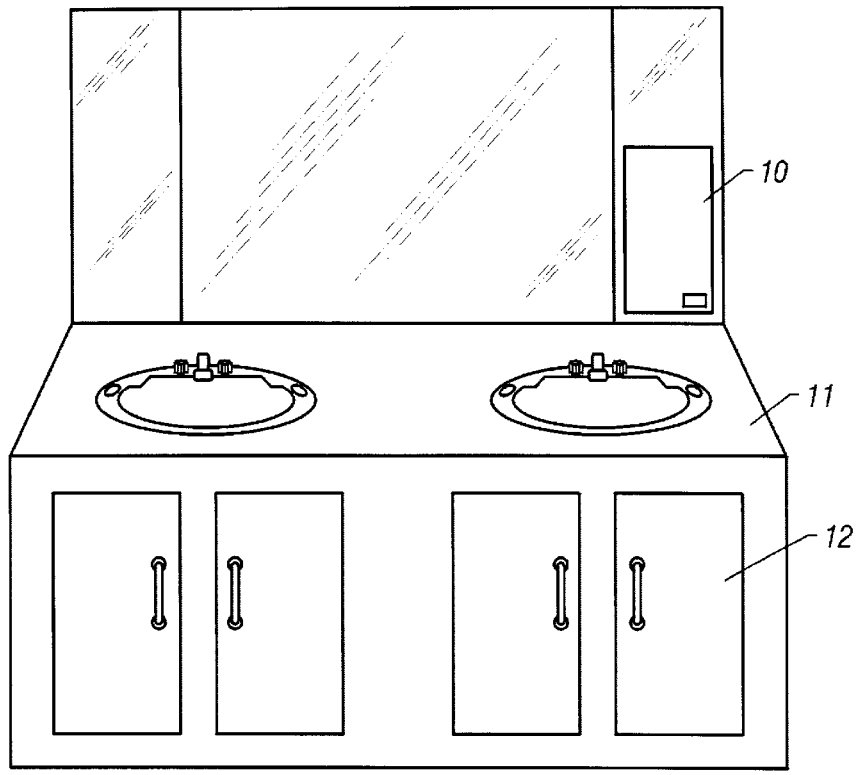
FIG. 1 depicts a bathroom arrangement using the present invention.

FIG. 1 depicts an exemplary arrangement for the invention. The smart mirror 10 is located adjacent to a bathroom fixture 11. Note that the location and size of the smart mirror 10 is by way of example only, as the smart mirror could be larger or smaller, and placed in a different location in the house, e.g. in a bedroom. The smart mirror may also be located closer to the center of the fixture mirrors. The smart mirror may be used in locations other than a house, e.g. apartment, condo, hotel, motel, office building, shopping mall, or coffee house.

Figure 2:
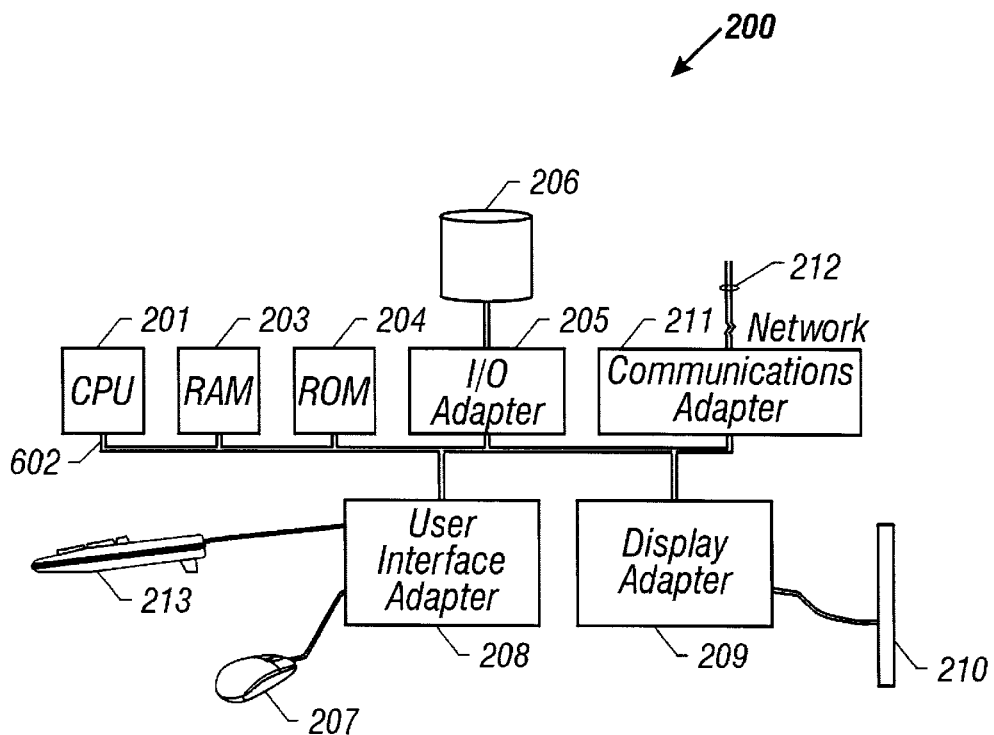
FIG. 2 depicts a block diagram of a computer system which is adapted to work with the present invention.

The computer system used to operate the mirror may be located directly behind the mirror, adjacent to the mirror (e.g. behind the cabinet door 12), or in another room the house. If the computer system is located behind the mirror, then the mirror would be moveable to allow access the computer system. FIG. 2 depicts computer system 200 adapted to work with the present invention. Central processing unit (CPU) 201 is coupled to system bus 202. The CPU 201 may be any general purpose CPU, such as an HP PA-8500 or Intel Pentium processor. However, the present invention is not restricted by the architecture of CPU 201 as if long as CPU 201 supports the inventive operations as described herein. Bus 202 is coupled to random access memory (RAM) 203, which may be SRAM, DRAM, or SDRAM. ROM 204 is also coupled to bus 202, which may be PROM, EPROM, or EEPROM. RAM 203 and ROM 204 hold user and system data and programs as is well known in the art.

The bus 202 is also coupled to input/output (I/O) controller card 205, communications adapter card 211, user interface card 208, and display card 209. The I/O card 205 connects to storage devices 206, such as one or more of hard drive, CD drive, floppy disk drive, tape drive, to the computer system. Communications card 211 is adapted to couple the computer system 200 to a network 212, which may be one or more of telephone network, local (LAN) and/or wide-area (WAN) network, Ethernet network, and/or Internet network. User interface card 208 couples user input devices, such as keyboard 213 and pointing device 207, to the computer system 200. The pointing device and/or the keyboard may be the touch sensitive display screen 210. The display card 209 is driven by CPU 201 to control the display on display device 210 (the mirror display). The computer system may also include a television link, e.g. cable, and adapter card (connected to bus 202) which would allow for television programs to be shown on the smart mirror. The source for the television programs could be cable, satellite dish, antenna, VCR, DVD, camcorder, close circuit TV, etc. The computer system could also comprise a printer port, which would allow for user selected information to be printed. Also, the computer system could include an infrared port, which would be located adjacent to the display screen and readily accessible to the user. This would allow for a user to connect other devices to the system to download information. For example, a use could connect a personal data assistant and download the appointment schedule. Other port types could be used instead of or along with the infrared port, e.g. USB port(s), serial port(s), and/or parallel port(s). Note that the computer system is by way of example only, as an Internet box, which comprises only the basic components needed to access the Internet could be used.

If the smart mirror is used in a relatively hostile environment, such as a bathroom, then additional elements may be necessary. For example, the mirror display screen may use an anti-fog coating and/or a heating system to prevent steam/fog build up on the screen. Also the computer system and the mirror display should be sealed from moisture (both steam and liquid water), which could cause corrosion. The smart mirror should also tolerate rapid temperature changes, as well as extremes of high and low temperatures. Similarly, the smart mirror should tolerate extremes of high and low humidity changes, as well as rapid changes in humidity.

The smart mirror display could be formed from a liquid crystal screen. The smart mirror has two modes. In a power off mode, the smart mirror acts as a standard reflective mirror. Any object placed in front of the mirror would cause a reflected image to be formed. In a power on mode, then the smart mirror becomes a display device. In one embodiment, the reflective operation of the mirror may be turned off when the display device is turned on. Thus, objects placed in front of the mirror would not generate reflected images, and only the display information is shown to the user. This is the preferred embodiment for the display of television programs. Alternatively, the reflective operation can be overlaid with the display operation. The information being displayed by the device appears to the user to originate on the surface of the smart mirror. The reflected image of the user that is provided to the user appears to originate at a certain distance behind the mirror (the certain distance being equal to the distance between the source object (e.g. the user) and the mirror surface). Thus, a user could switch between their own reflected image and the display information by changing the focus of the eyes. This would allow a user to receive information while performing sight intensive activities, e.g. shaving or applying makeup.

Figure 3:
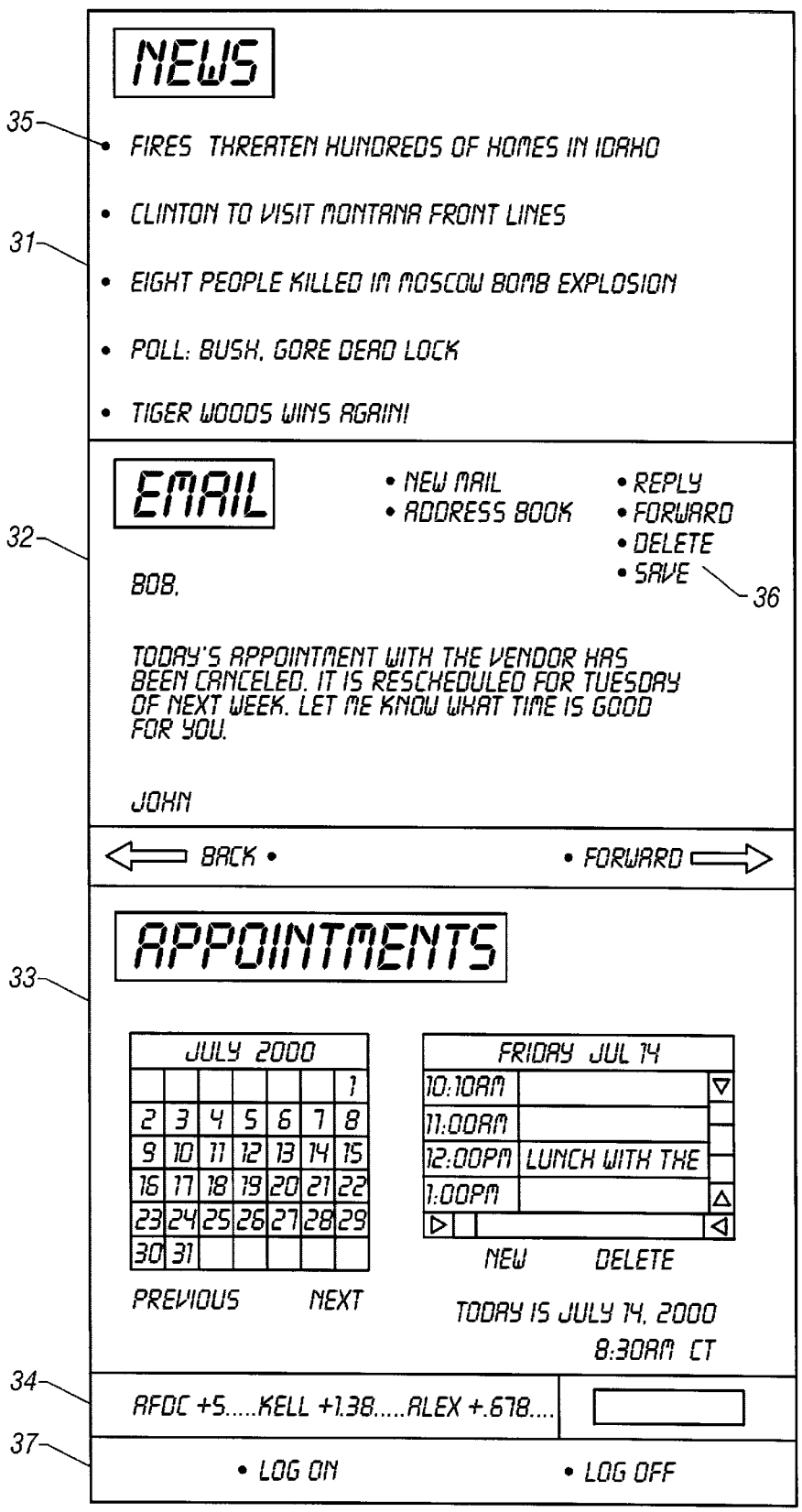
FIG. 3 depicts a user interface of the present invention.

FIG. 3 depicts a preferred embodiment of the user interface (UI) 30 that the smart mirror 10 provides to the user. The UI preferably includes a news portion 31 which provides news information to the user. If the user touches portion or button 35 on the touch screen, then additional story information could be provided. The UI also preferably includes e-mail portion 32 which provides e-mails to the user. The user can perform various actions on the e-mails according to controls or buttons 36, which are touch screen controls. Actions such as reply, forward or new mail will cause a touch screen keyboard to appear, which can be used by the user to generate the various responses. The UI also preferably includes an appointment calendar section 33. This section allows the user to review their schedule for various days and times. Different months can be selected by using the previous and next buttons. Selecting a particular day on the calendar will result in displaying the appointments for that day. Selecting a particular appointment entry, as well as selecting new entry, will cause a touch screen keyboard to appear, which can be used by the user to form/edit entries. Note that the e-mail section and/or the calendar section may be edited via a character recognizer instead of or in addition to a keyboard. The character recognizer would allow a user to input text and commands via a stylus and/or finger. The user would write the desired letters into the character recognizer portion of the user interface. The UI may also includes stock data section 34, which provides the user with stock information, which can be streaming from a service, or the current prices of particular stocks selected by the user and stored in the user profile.

The computer system maintains a profile of the different users, thus different people (members of the family) would be provided with their e-mails and appointments, as well as specific news of interest. The computer system would communicate with a Internet or network service provider to obtain the necessary information and e-mails. A particular user would log in by selecting the log on button in screen portion 37. The user would be presented with a table of defined users and/or a touch screen keyboard to appear, which can be used by the user to enter their name and/or other profile information. When finished, the user would log out by selecting the log out button or by turning the display screen off.

Note that other embodiments are possible, for example a television portion could be added which would have channel controls, volume controls, etc, or if an Internet box is used, then the appointments portion 33 may not be present. Thus, the UI could comprise more or fewer sections, and sections having different functions and/or providing different information. Also note that the appearance of the UI is by way of example only as other UI's could be used to perform in a similar manner.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A mirror comprising:
  front panel that displays information to a user and reflects an image of the user to the user; and
  a computer system for providing the information to the front panel;
  wherein said minor is mounted in a room.

2. The mirror of claim 1 wherein:
  the front panel is switchable between displaying the information and reflecting the image.

3. The mirror of claim 1 wherein:
  the front panel simultaneously displays the information and reflects the image.

4. The mirror of claim 3 wherein:
  the user switches eye focus between the information and the image to perceive one of the information and the image.

5. The mirror of claim 1 wherein said room comprises a bathroom.

6. The minor of claim 1 wherein the front panel comprises:
  a user interface that displays the information to the user.

7. The mirror of claim 6 wherein:
  the information comprises one of news, an e-mail message, and an appointment calendar.

8. The minor of claim 6 wherein:
  the user interface includes a graphical keyboard.

9. The mirror of claim 6 wherein:
  the user interface includes a character recognizer.

10. A mirror comprising:
  means for providing information;
  means for displaying the information to a user and reflecting an image of the user to the user;
  wherein said minor is mounted in a room; and
  the means for displaying simultaneously displays the information and reflects the image.

11. The mirror of claim 10 wherein:
  the means for displaying is switchable between displaying the information and reflecting the image.

12. The mirror of claim 10 wherein:
  the user switches eye focus between the information and the image to perceive one of the information and the image.

13. The mirror of claim 10 wherein said room comprises a bathroom.

14. A The mirror of claim 10 wherein:
  the information comprises one of news, an e-mail message, and an appointment calendar.

15. The mirror of claim 10 wherein:
  the means for displaying includes a graphical keyboard.

16. The mirror of claim 10 wherein:
  the means for displaying includes a character recognizer.

17. A mirror information system comprising:
  a mirror comprising
    a front panel that displays information to a user and reflects an image of the user to the user; and
    a computer system for providing the information to the front panel; and
  a building wall, said mirror being coupled to said building wall.

18. The system of claim 17 wherein said front panel comprises a user interface that displays the information to the user; and
  wherein said user interface comprises at least one component selected from the group consisting of a graphical keyboard and a character recognizer.

19. The system of claim 17 wherein the front panel is switchable between displaying the information and reflecting the image.

* * * * *